Aug. 14, 1945.    W. SCHADE    2,382,669
TELEPHOTO LENS
Filed April 24, 1942    2 Sheets-Sheet 1
Fig. 1
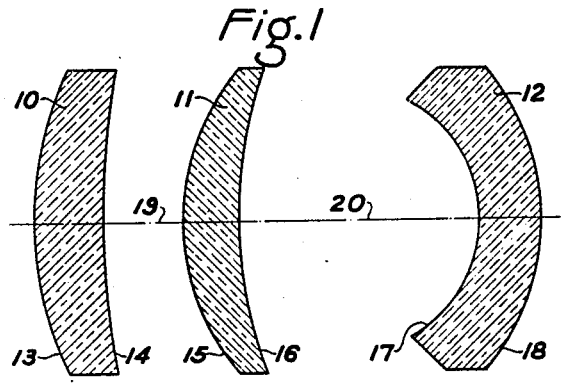
Fig. 2
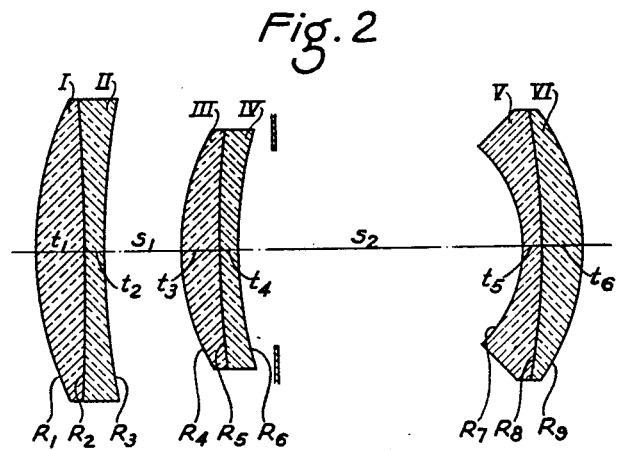
Fig. 3
| EXAMPLE 1 | F = 100 mm. | B.F. = 32.6 mm. | f/3.8 | |
|---|---|---|---|---|
| LENS | $N_D$ | V | RADII | THICKNESSES |
| I | 1.516 | 64.0 | $R_1$ = + 34.4 mm. | $t_1$ = 4.7 mm. |
| II | 1.617 | 36.6 | $R_2$ = − 200.0 mm. | $t_2$ = 2.0 mm. |
|   |       |      | $R_3$ = + 82.2 mm. | $s_1$ = 7.7 mm. |
| III | 1.516 | 64.0 | $R_4$ = + 23.5 mm. | $t_3$ = 3.7 mm. |
| IV | 1.617 | 36.6 | $R_5$ = +266.7 mm. | $t_4$ = 1.6 mm. |
|   |       |      | $R_6$ = + 43.8 mm. | $s_2$ = 28.1 mm. |
| V | 1.611 | 57.2 | $R_7$ = − 13.6 mm. | $t_5$ = 2.0 mm. |
| VI | 1.605 | 38.2 | $R_8$ = − 72.6 mm. | $t_6$ = 4.0 mm. |
|   |       |      | $R_9$ = − 22.3 mm. | T = 53.8 mm. |
Willy Schade
INVENTOR
BY
ATTY. & AG'T.

Aug. 14, 1945.  W. SCHADE  2,382,669
TELEPHOTO LENS
Filed April 24, 1942  2 Sheets-Sheet 2

Fig.4

| EXAMPLE 2 | | $F=100mm$ | $B.F.=32.6mm.$ | $f/3.8$ |
|---|---|---|---|---|
| LENS | $N_D$ | V | RADII | THICKNESSES |
| I | 1.516 | 64.0 | $R_1 = + 34.4 mm.$ | $t_1 = 2.5 mm.$ |
| II | 1.617 | 36.6 | $R_2 = - 199.5 mm.$ | $t_2 = 1.6 mm.$ |
|  |  |  | $R_3 = + 84.5 mm.$ | $s_1 = 3.1 mm.$ |
| III | 1.516 | 64.0 | $R_4 = + 23.5 mm.$ | $t_3 = 2.6 mm.$ |
| IV | 1.617 | 36.6 | $R_5 = + 275.8 mm.$ | $t_4 = 1.7 mm.$ |
|  |  |  | $R_6 = + 44.9 mm.$ | $s_2 = 30.4 mm.$ |
| V | 1.611 | 57.2 | $R_7 = - 13.6 mm.$ | $t_5 = 1.3 mm.$ |
| VI | 1.617 | 36.6 | $R_8 = - 231.2 mm.$ | $t_6 = 1.6 mm.$ |
|  |  |  | $R_9 = - 23.6 mm.$ | $T = 53.8 mm.$ |

Fig.5

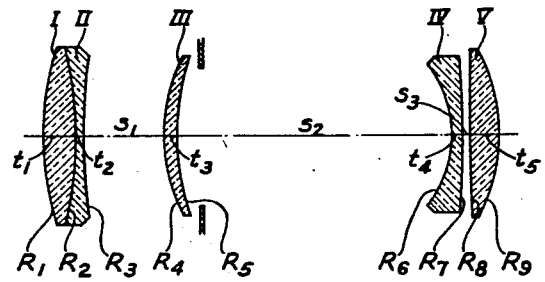

Fig.6

| EXAMPLE 3 | | $F=100mm.$ | $B.F.=39.2mm.$ | $f/5.6$ |
|---|---|---|---|---|
| LENS | $N_D$ | V | RADII | THICKNESSES |
| I | 1.573 | 57.4 | $R_1 = + 29.3 mm.$ | $t_1 = 3.0 mm.$ |
| II | 1.617 | 36.6 | $R_2 = - 37.9 mm.$ | $t_2 = 1.0 mm.$ |
|  |  |  | $R_3 = + 60.0 mm.$ | $s_1 = 7.9 mm.$ |
| III | 1.541 | 59.9 | $R_4 = + 17.4 mm.$ | $t_3 = 1.2 mm.$ |
|  |  |  | $R_5 = + 24.9 mm.$ | $s_2 = 27.1 mm.$ |
| IV | 1.744 | 45.8 | $R_6 = - 11.0 mm.$ | $t_4 = 1.0 mm.$ |
|  |  |  | $R_7 = - 91.3 mm.$ | $s_3 = 0.9 mm.$ |
| V | 1.617 | 38.5 | $R_8 = + 227.5 mm.$ | $t_5 = 2.8 mm.$ |
|  |  |  | $R_9 = - 17.7 mm.$ | $T = 44.9 mm.$ |

Willy Schade
INVENTOR
BY
ATT'Y. & AG'T.

Patented Aug. 14, 1945

2,382,669

UNITED STATES PATENT OFFICE 2,382,669

TELEPHOTO LENS

Willy Schade, Rochester, N. Y., assignor to Eastman Kodak Company, Rochester, N. Y., a corporation of New Jersey Application April 24, 1942, Serial No. 440,291

13 Claims. (Cl. 88—57)

This invention relates to telephoto lenses.

Various ways of defining telephoto lenses have been proposed, and some of them are so broad as to include lenses in which the telephoto action is practically negligible. Most real telephoto lenses have their rear principal plane in front of the front surface of the lens. In fact, the distance from the front surface of the lens to the rear focal plane is often about 80 per cent of the focal length of the lens. I define telephoto lenses as those in which this distance is generally less than the focal length, or perhaps in some cases up to 105 per cent of the focal length, in which case the rear principal plane is just inside the front surface of the system. The preferred form of telephoto lenses has this value between .7 of the focal length and the focal length; the present invention finds its greatest use when applied to such preferred telephotos.

It is the main object of the invention to give improved rim ray correction. I used the term, "rim ray" to refer to the marginal rays of an oblique beam and if one considers a beam coming up from below the axis to the front of the lens, I refer to the upper marginal ray as the upper rim ray and to the lower ray of the beam as a lower rim ray. Rim ray aberration is the discrepancy between these rays and the principal rays when they strike the focal plane.

Another object of the invention is to give improved spherical aberration and highly improved coma.

Still another and very important object of the invention is the correction of spherochromatism which is the variation of spherical aberration with wave length and is sometimes called the chromatic variation of spherical aberration. Some prior lenses highly corrected for spherical aberration at one wave length were found to have an intolerable amount of this aberration at another wave length. The present invention corrects this trouble. All of these objects are accomplished without spoiling the correction for distortion and, in fact, the distortion is even slightly improved over the field to be covered.

According to the invention, a telephoto objective is made up of three air spaced components each of which may be simple, but are preferably compound and in fact, may even include air spaces within the component in addition to the spaces separating the three components. Two of these components have positive power and are on the long conjugate or front side of the system and the rear or short conjugate side of the system consists of a negative component. The above objects of the invention are obtained with such a system by proper spacing of the three components. Defined in one way, the separation of the middle and rear components should be between .1F and .5F where F is the focal length of the objective, and the separation of the front and middle components should be between .04F and .25F. Defined in another way, the ratio of the rear separation to the front separation should be between 1 and 20. Preferably both of these requirements are met.

In a preferred embodiment of the invention, the front component is meniscus, convex to the front and the rear component is also meniscus convex to the rear. Preferably the front component consists of a positive element cemented to the front of a negative element, and the rear component consists of a positive element cemented to or spaced behind a negative element. When the rear component contains an air space, the fact that the component as a whole is meniscus merely means that both the front and rear surfaces of this component are concave to the front.

Preferably the rear surface of the rear component has a radius between $-0.1F$ and $-2F$.

In the most preferred embodiment of the invention all three components are meniscus, the positive ones being convex to the front and the negative one being concave to the front with the outer surfaces of each component having the following values. The radius of the front surface of the front component should be between .15F and F, the rear surface of this component should have a radius between .3F and 5F; the front surface of the middle component should have a radius between .15F and .5F, and the rear surface of this component should have a radius between .15F and 1.5F. The front surface of the rear component should have a radius between $-.05F$ and $-F$ and the rear surface of the rear component should have a radius between $-.1F$ and $-2F$, where the plus and minus signs refer to surfaces, respectively convex and concave to the front.

In a preferred embodiment of the invention none of the components have an air space and preferably each of them consists of a meniscus cemented doublet. Since, as pointed out above, the invention finds its greatest use with the preferred form of telephoto lenses, the distance from the front surface of the front component to the rear focal plane is preferably between .7F and F.

In the accompanying drawings:

Fig. 1 illustrates the general embodiment of the invention.

Fig. 2 illustrates a preferred form of this general embodiment.

Figs. 3 and 4 are data tables corresponding to Fig. 2.

Fig. 5 illustrates a different preferred embodiment of the invention.

Fig. 6 is the data table corresponding to Fig. 5.

In Fig. 1 a telephoto lens according to the invention is made up of two positive components 10 and 11, and a negative component 12 so that the separation 19 between the components 10 and 11 is between .04F and .25F where F is the focal length of the objective and the separation 20 between the components 11 and 12 is between .1F and .5F. The ratio of the separation 20 to the separation 19 is between 1 and 20. Preferably all three components are meniscus as shown so that the surfaces 13, 14, 15 and 16 are convex to the front, and the surfaces 17 and 18 are concave to the front. Each of these components 10, 11, and 12, may be simple elements or may be compound with cemented surfaces or even with air spaces between two or more elements. Preferable embodiments are illustrated in Figs. 2 and 5.

The lens shown in Fig. 2 may have the specifications shown in Figs. 3 and 4 and repeated below:

*Example 1*

| F=100 mm. | | B. F.=32.7 mm. | | f/3.8 |
|---|---|---|---|---|
| Lens | $N_D$ | V | Radii | Thicknesses |
| | | | Millimeters | Millimeters |
| I | 1.516 | 64.0 | $R_1=+34.4$ | $t_1=4.7$ |
| II | 1.617 | 36.6 | $R_2=-200.0$ | $t_2=2.0$ |
| | | | $R_3=+82.2$ | $S_1=7.7$ |
| III | 1.516 | 64.0 | $R_4=+23.5$ | $t_3=3.7$ |
| IV | 1.617 | 36.6 | $R_5=+266.7$ | $t_4=1.6$ |
| | | | $R_6=+43.8$ | $S_2=28.1$ |
| V | 1.611 | 57.2 | $R_7=-13.6$ | $t_5=2.0$ |
| VI | 1.605 | 38.2 | $R_8=-72.6$ | $t_6=4.0$ |
| | | | $R_9=-22.3$ | $T=53.8$ |

*Example 2*

| F=100 mm. | | B. F.=35.2 mm. | | f/5.6 |
|---|---|---|---|---|
| Lens | $N_D$ | V | Radii | Thicknesses |
| | | | Millimeters | Millimeters |
| I | 1.516 | 64.0 | $R_1=+34.4$ | $t_1=2.5$ |
| II | 1.617 | 36.6 | $R_2=-199.5$ | $t_2=1.6$ |
| | | | $R_3=+84.5$ | $S_1=3.1$ |
| III | 1.516 | 64.0 | $R_4=+23.5$ | $t_3=2.6$ |
| IV | 1.617 | 36.6 | $R_5=+275.8$ | $t_4=1.7$ |
| | | | $R_6=+44.9$ | $S_2=30.4$ |
| V | 1.611 | 57.2 | $R_7=-13.6$ | $t_5=1.3$ |
| VI | 1.617 | 36.6 | $R_8=-231.2$ | $t_6=1.6$ |
| | | | $R_9=-23.6$ | $T=44.8$ |

The embodiment shown in Fig. 5 has the specification shown in Fig. 6 and repeated below.

*Example 3*

| F=100 mm. | | B. F.=39.2 mm. | | f/5.6 |
|---|---|---|---|---|
| Lens | $N_D$ | V | Radii | Thicknesses |
| | | | Millimeters | Millimeters |
| I | 1.573 | 57.4 | $R_1=+29.3$ | $t_1=3.0$ |
| II | 1.617 | 36.6 | $R_2=-37.9$ | $t_2=1.0$ |
| | | | $R_3=+60.0$ | $S_1=7.9$ |
| III | 1.541 | 59.9 | $R_4=+17.4$ | $t_3=1.2$ |
| | | | $R_5=+24.9$ | $S_2=27.1$ |
| IV | 1.744 | 45.8 | $R_6=-11.0$ | $t_4=1.0$ |
| | | | $R_7=-91.3$ | $S_3=0.9$ |
| V | 1.617 | 38.5 | $R_8=+227.5$ | $t_5=2.8$ |
| | | | $R_9=-17.7$ | $T=44.9$ |

The distance from the front surface of the lens to the rear focal plane is the sum of the total thickness of the lens and the back focal length. Therefore, in Example 1 this distance is 53.8 plus 32.6 which equals 86.4 mm., which is 86.4 per cent of the focal length of the system. Similarly, in Example 2 this distance equals 80 per cent of the focal length and in Example 3 it equals 84.1 per cent of the focal length. In Examples 1 and 2, all three components are cemented doublets, whereas in Example 3 the second component is simple, and the third component is an air spaced doublet. However, in each case the radii of curvature of the outer surfaces of the components fall within the preferred range defined above.

Example 3 is specifically an embodiment of my invention developed by Mr. George Aklin.

Having thus described three preferred embodiments of my invention, I wish to point out that it is not limited to these arrangements but is of the scope of the appended claims.

What I claim and desire to secure by Letters Patent of the United States is:

1. A telephoto objective comprising three air spaced components two of which have positive power and the rear one of which has negative power, the separation of the middle and rear components being between .1F and .5F where F is the focal length of the objective and the separation of the front and middle components being between .04F and .25F, and being less than the first-mentioned separation and the front surface of the middle component being convex to the front.

2. A telephoto objective according to claim 1 in which the front component is meniscus convex to the front and consists of a positive element cemented to the front of a negative element.

3. A telephoto objective according to claim 1 in which the front surface of the front component has a radius between +.15F and +F, the rear surface of the front component has a radius between +.3F and +5F, the front surface of the middle component has a radius between +.15F and +.5F, the rear surface of the middle component has a radius between +.15F and +1.5F, the front surface of the rear component has a radius between −.05F and −F and the rear surface of the rear component has a radius between −.1F and −2F where the plus and minus signs refer respectively to the surfaces convex and concave to the front.

4. A telephoto objective according to claim 1 in which each component includes only two air glass refractive surfaces.

5. A telephoto objective comprising three air spaced components two of which have positive power and the rear one of which has negative power, the ratio of the separation of the middle and rear components to the separation of the front and middle components being between 1 and 20 and the front component consisting of a meniscus doublet convex to the front and the middle component having a front surface convex to the front.

6. A telephoto objective comprising three air spaced components two of which have positive power and the rear one of which has negative power, the front and middle components being meniscus convex to the front and separated by a distance between .04F and .25F where F is the focal length of the objective and the rear surface of the rear component being concave to the front with a radius between −.1F and −2F and in which the ratio of the separation of the middle and rear components to the separation of the front and middle components is between 1 and 20.

7. A telephoto objective according to claim 1 in which each component consists of a meniscus cemented doublet, the positive components being convex to the front and the negative component being convex to the rear.

8. A telephoto objective according to claim 1 in which the distance from the front surface to the rear focal plane is between .7F and F.

9. A telephoto objective consisting of three airspaced compound components the front two of which are positive and have convex front surfaces and the rear one of which is negative and meniscus in form, the airspace between the two front components being less than half the equivalent focal length of the objective and also less than the airspace between the middle and the negative component.

10. A telephoto objective as in claim 9 in which all three components are meniscus in shape.

11. A telephoto objective as in claim 9 in which the distance from the front surface to the rear focal plane is between 0.7F and F where F is the focal length of the objective.

12. A telephoto objective as in claim 9 in which the two positive components are meniscus and each consists of a positive element cemented to the front of a negative element.

13. A telephoto objective consisting of two positive doublets spaced less than ½ the focal length of the objective and a rear negative doublet, meniscus in form spaced from the nearer positive doublet a distance greater than the separation of the two positive doublets, the front surfaces of both positive doublets being convex to the front the cemented surface of the front positive doublet being concave to the front, the cemented surface of the second doublet have a radius of curvature with an absolute value greater than said focal length and the cemented surface of the rear doublet being concave to the front.

WILLY SCHADE.